Aug. 27, 1968  J. L. HORTON  3,398,543
HYDROCARBON GAS LIQUEFACTION BY ADMIXED GAS-LIQUID
EXPANSION AND HEAT EXCHANGE
Filed March 23, 1966
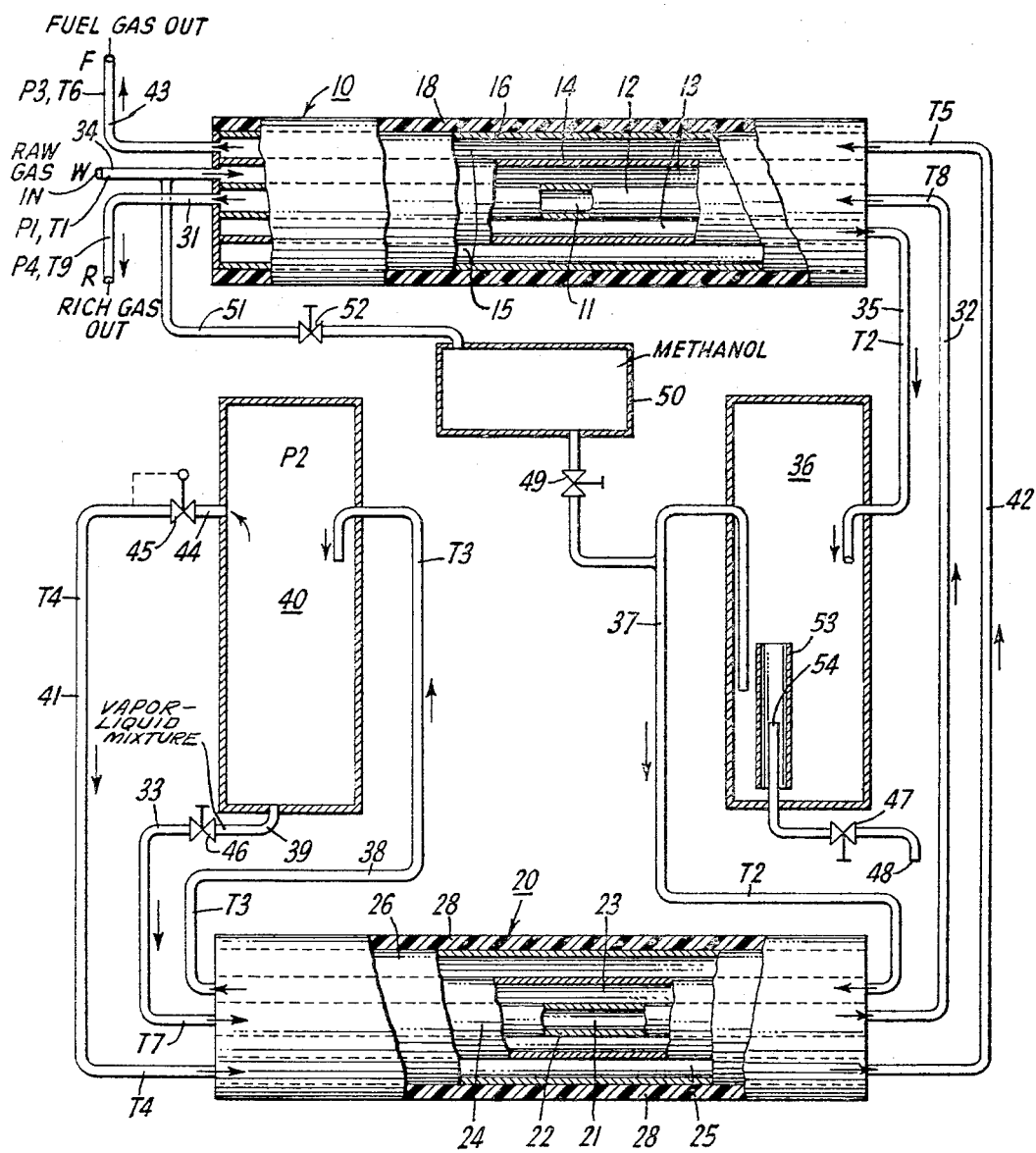
INVENTOR.
JOHN LEROY HORTON
BY
*Arthur J. Plantamura*
ATTORNEY United States Patent Office 3,398,543
Patented Aug. 27, 1968

3,398,543
HYDROCARBON GAS LIQUEFACTION BY AD-
MIXED GAS-LIQUID EXPANSION AND HEAT
EXCHANGE
John Leroy Horton, Shreveport, La., assignor to American
Machine & Foundry Company, a corporation of New
Jersey
Continuation-in-part of application Ser. No. 306,428,
Sept. 4, 1963. This application Mar. 23, 1966, Ser.
No. 536,911
3 Claims. (Cl. 62—11)

ABSTRACT OF THE DISCLOSURE

A hydrocarbon feed gas is separated by cooling the feed gas in the intermediate passage of a concentric three passage heat exchanger to condense a portion of the hydrocarbons to form a lighter gaseous component and a heavier liquid component. A separated expanded gaseous component and an expanded gas-liquid admixture is passed in heat exchange with the feed gas in the concentric heat exchanger without permitting liquid to accumulate in a separation zone.

---

The present application is a continuation-in-part of application Ser. No. 306,428, now abandoned, filed on Sept. 4, 1963.

This invention relates to gas sepaartion, and more particularly relates to a method and apparatus for separating various components of a stream of vapors by regenerative cooling thereof under substantially constant-enthalpy conditions.

It is a principal object of this invention to provide a method and apparatus in which a high degree of efficiency results from pre-cooling, separating and then expanding the separated components of the input stream and feeding back substantially all of the recovered components in separate paths and in indirect heat-exchange relationship with the incoming stream, thereby cooling the latter and superheating the separated components in each feedback path.

It is another object of the invention to provide a coaxial system which can be conveniently heat-insulated to prevent transfer of ambient heat thereinto.

Another major object of this invention is to provide an improved method and apparatus for stripping heavier components from the input vapor stream using improved expansion and regeneration techniques. The cooling achieved due to the Joule-Thomson effect, by expansion of the separated components and regenerative counter-flowing thereof, is many times as great as would be obtained by expansion alone. This improvement results essentially from accumulating the temperature drop by feeding back substantially all separated and cooled components so that the weight of flow through the apparatus is essentially the same both in the forward and in the regenerative directions. The degree of heat exchange in the regenerative path being designed so that it is adequate to again superheat the separated component streams by efficiently absorbing heat from the incoming stream, ambient atmospheric heat being essentially excluded.

Another object of the invention is to provide a method and apparatus wherein more of the heavier components are recovered as a result of separation at a relatively high pressure and before expansion, and wherein the pressure in the separator is maintained below the retrograde pressure of the cooled vapors. This is critical because separation at a pressure above the retrograde point would result in a carry-over of heavy components as vapors in the device.

Other objects and advantages of the invention will become apparent during the following discussion of the drawing showing a flow diagram of a practical embodiment of the invention.

The embodiment shown in the drawing illustrates a convenient arrangement of two heat-exchangers 10 and 20 both of which comprise three concentric tubes through which fluid streams flow. Exchanger 10 includes a small inner tube 12, an intermediate tube 14, and an outer tube 16. An external layer of heat insulating material 18 is preferably applied to the outer periphery of tube 16. The heat exchanger 20 is of similar construction and includes an inner tube 21, an intermediate tube 24, and an outer tube 26, and heat insulation 28.

In both exchangers there are three flow paths. There is an inner path communicating with the bores 11 and 21 of inner tubes 12 and 22 respectively, via the pipe 32, and communicating at one end with a rich gas outlet pipe 31 and at the other with the expansion valve 46 via the pipe 33 from separator 40. There is also an intermediate path through tubes 14 and 24 wherein the raw inlet gas proceeds to the separator 40. The inlet gas enters the system through the pipe 34, passes through the annulus 13 between the inner tube 12 and the intermediate tube 14, and flows through the connecting pipe 35 into a water knockout 36. From the knock-out unit 36 the gas flows through the annulus 23 inside of heat exchanger 20 and passes via pipe 38 to the separator 40.

The outer path of the system includes the pipe 41 leading from separator 40, the annulus 25 between the intermediate tube 24 and the outer tube 26, the pipe 42, the annulus 15 between the intermediate tube 14 and the outer tube 16, and the gas outlet pipe 43. The intermediate path receives and conducts the relatively hot and high pressure inlet gas W to the separator 40 and is the main, or forward-flow path; whereas the inner and outer paths are counter-flow regenerative paths, delivering fuel gas F and rich gas R at their outlets 43 and 31 respectively.

In this system of the invention hereinabove described, it is important that the counter-flow regenerative paths exiting at 31 and 43, be arranged as shown with respect to the incoming stream as this arrangement provides the maximum drive for the heat transfer relationship and results in a lower heat gain from the ambient air. It also exposes the least amount of heat transfer surface in the exchangers. In fact, the proper ratio of the area of heat transfer surface, labeled 14, 12, 22 and 24 must be maintained or the temperature profiles producing heat transfer will not be proper for efficient regeneration. Lacking this proper balance, continuity of the process is hampered and efficiency becomes impractical.

OPERATION

In the system of the invention as depicted, the raw inlet gas W is introduced through the intermediate concentric inlet pipe 34 and progresses in the direction of the separator 40. Due to cooling of the raw gas stream accomplished in the two heat exchangers, the temperature of the stream will be substantially lowered by the time it reaches the separator 40, thereby condensing a fraction of the feed stream. The separator 40 divides the cooled stream into two component streams, including a lighter or vapor stream which passes from the separator 40 through pipe 44, and a heavier stream which passes from separator 40 through the pipe 39.

In accordance with the invention it has been found that separator 40 must operate in a manner which permits no liquid to accumulate in separator 40. Operation is conducted so that all the liquid separated in the separator 40, as well as a minor portion of the vapor separated therein, passes through and is educted through pipe 39 and valve 46. The adjustment of valve 46 and the operation of the separator in the manner described is essential for regeneration to cold, i.e., sub-zero temperatures to occur.

The gaseous stream leaving through the pipe 44 is expanded by an automatic pressure reducing regulator 45 acting as a throttling valve thereby cooling the vapors due to the Joule-Thomson effect. The component mixture of liquid and small amount of vapor passing outwardly through the pipe 39 are also expanded and cooled substantially following passage through valve 46.

The amount of cooling across valve 46 is dependent upon the amount of vapor expanded with the liquid across the valve and varies directly with the vapor expanded. The greater the volume of vapor expanded with the liquid, the greater the temperature drop across this valve.

The expanded and chilled components R and F are then respectively conducted through the inner and outer counterflow paths in the two heat exchangers 10 and 20 for the purpose of regeneratively absorbing heat from the incoming mainflow gas stream W in the intermediate path. A water knock-out 36 is preferably provided between the two heat exchangers 10 and 20 in the mainflow path of the incoming gas for the purpose of removing any water, and undesirable constituents which condense from the feed stream as a result of the cooling in the first heat exchanger 10.

The water knock-out 36 is preferably provided with a bleed arrangement comprising a cylinder 53 open at both ends. Water removed at 48 is the only component of the input gas W which is not regeneratively counterflowed. The top of the outlet pipe 54 is somewhat elevated inside the cylinder 53, so that as the upper hydrocarbon layer and the lower water layer accumulate, water is drained continuously. As more water accumulates it tends to raise the head outside the cylinder 53 which in turn forces more water out of pipe 54 resulting in essentially maintaining an equilibrium level. The effect of removal of minor quantities of water at this point does not significantly effect the weight of the product counterflow since it is only a very small proportion of the total vapor content.

Although an insulating construction is illustrated only at 18 and 28 on heat exchangers 10 and 20, it will be understood that the various other pipes including the water knock-out 36 and the separator 40, preferably should be well heat insulated on their external surfaces. This is necessary to prevent, to as great an extent as possible, the absorbing of ambient heat into the system.

To avoid interruption of operation, since the temperature achieved in separator 40 and exchanger 20 is below the hydrate point of the main stream, freezing in passage 23 and in the separator 40 should be provided against. This is easily accomplished by the injection of suitable quantities of methanol or other suitable antifreeze into pipe 37. An antifreeze tank 50 with a differential pressure line 51 conveniently connected to feed line 34 help to force the antifreeze into line 37 aided by valve 52. The rate of methanol flow may be adjusted by changing the position of valve 49.

Except for a small amount of water drained from the pipe 48, the flow of raw vapor W into the heat exchangers 10 and 20 through the pipes 34 and 37 precisely equals the counterflow in the regenerative direction, this counterflow being obtained by operating into a lower pressure at the outlets 31 and 43 as compared with the pressure at the inlet 34. In many prior art systems, one or more of the separated hydrocarbon components is delivered to storage without any expansion and/or introduction thereof into regenerative flow. The degree of cooling due to the Joule-Thomson effect is made to multiply in the present system by expansion of all of the components after their mutual separation, and by feeding back the expanded components in heat-exchange relation with the incoming raw gas. These two features are combined in a system operating with such a relatively high degree of heat insulation that there is very little difference between the temperatures of the entering and leaving streams. So much heat is absorbed from the incoming stream W by the departing streams F and R in the heat exchangers 10 and 20 that the fuel gas F discharged at the pipe 43 and the rich gas R discharged at the pipe 31 are both discharged in superheated condition at very nearly the same temperature as the temperature at which they were introduced into the system at the raw gas inlet pipe 34, but at a considerably lower pressure. It is significant to note that the separation of the components must occur prior to reduction in pressure at the expansion valves 45 and 46. Also it is important that separation is carried out at a higher pressure because this encourages a greater separation of the heavier components as long as the upper limit of pressure is below the retrograde point.

As noted hereinabove, it is necessary in operation of the system that valve 46 be operated in a manner permitting all of the liquid, which is isolated in the separator, plus some vapor to be throttled, resulting in the maximum temperature drop across the valve. Repeated attempts to attain the desired regeneration with the valve passing liquid only were unsuccessful.

The following table of temperatures and pressures, taken at the various points of the system labeled on the diagram, complies the results of actual tests run on apparatus of the type shown in the illustrated drawing.

| Data Series | A | B | C |
| --- | --- | --- | --- |
| Wet gas volume (M. c.f.d.) | 115.0 | 112.0 | 95.2 |
| Rich gas volume (M. c.f.d.) | 62.4 | 61.8 | 46.0 |
| Fuel gas volume (M. c.f.d) | 52.6 | 50.2 | 49.2 |
| Raw gas into exchanger 10 (° F.) | 100 | 98 | 96 |
| Raw gas into exchanger 20 (° F.) | 45 | 43 | 48 |
| Raw gas into separator (° F.) | −25 | −30 | −20 |
| Fuel gas to exchanger 20 (° F.) | −50 | −55 | −45 |
| Fuel gas to exchanger 10 (° F.) | 10 | 8 | 10 |
| Fuel gas out (° F.) | 62 | 60 | 58 |
| Rich gas to exchanger 20 (° F.) | −78 | −78 | −78 |
| Rich gas to exchanger 10 (° F.) | −2 | −2 | −2 |
| Rich gas out (° F.) | 66 | 65 | 61 |
| Wet gas inlet pressure (lbs.) | 287 | 285 | 287 |
| Separator pressure (lbs.) | 287 | 285 | 287 |
| Fuel gas pressure (outlet) (lbs.) | 40.5 | 40.5 | 40.5 |
| Rich gas pressure (outlet) (lbs.) | 6.0 | 5.0 | 1.5 |
| Ambient air temperature (° F.) | 103 | 99 | 87 |

Defining the degree of regeneration as the ratio of the temperature drop in the wet gas stream between the inlet and the separator 40 as compared with the temperature drop of the fuel gas across the valve 45, calculations made from the above test data show that the degree of regeneration for series A, B, and C, respectively, was 5.00, 5.12 and 4.63.

The present invention is not to be limited to the exact form illustrated in the drawing, in view of the fact that various changes apparent to one skilled in the art may be made within the scope of the following claims.

I claim:

1. The method of separating a vaporous feed mixture of hydrocarbons which is introduced at a relatively higher pressure into gaseous and liquid components at a relatively lower pressure, including the steps of:
   (a) flowing the mixture in the intermediate passage of a concentric three passage heat-exchanger;
   (b) separating the hydrocarbons into a heavier liquid component and a lighter gaseous component in a separation zone;
   (c) expanding a part of the lighter gaseous component to provide a first product stream;
   (d) without permitting liquid to accumulate in the separation zone educting in admixture the heavier liquid component withdrawn from the separation zone with the remaining part of the lighter gaseous component and expanding the heavier liquid component in admixture with the remaining part of the lighter gaseous component to provide a second product stream; and
   (e) counterflowing said expanded streams, which comprise essentially the entire weight of said feed mixture, in regenerative heat-exchange relationship with said mixture to chill the latter while heating the former by flowing one of said streams through the inner passage of said three passage heat exchanger and the other stream through the outer passage thereof;

(f) substantially excluding ambient heat to restore the temperature of the expanded components after counterflow to substantially the same temperature of the mainflow hydrocarbon feed mixture.

2. The method of claim 1, wherein the lighter gaseous component flows through the outer concentric passage of said heat exchanger.

3. The method of claim 1, wherein an antifreeze is introduced into the vaporous mixture prior to the separation.

References Cited

UNITED STATES PATENTS

| | | | |
|---|---|---|---|
| 1,020,102 | 3/1912 | Von Linde | 62—23 |
| 1,020,103 | 3/1912 | Von Linde | 62—23 |
| 1,804,432 | 5/1931 | Pollitzer | 62—20 |
| 2,209,534 | 7/1940 | Moore | 62—11 |
| 2,538,235 | 1/1951 | Coffey | 23—212 |
| 2,722,105 | 11/1955 | Keyes | 62—14 XR |
| 3,116,136 | 12/1963 | Horton et al. | 62—20 |
| 3,119,677 | 1/1964 | Moon et al. | 62—31 XR |
| 3,212,278 | 10/1965 | Huddleston | 62—23 |
| 3,212,277 | 10/1965 | Harper et al. | 62—23 |
| 3,240,023 | 3/1966 | De Lano | 62—23 |

OTHER REFERENCES

Fuels and Their Combustion by Haslam & Russell, 1926, p. 602.

Economic Aspects of Producing Pipeline Gas, Using Lurgi Generators for Gasifying Bituminous Char by Katell, Faber & Constantine, 1959, Bureau of Mines #5547, p. 7.

NORMAN YUDKOFF, *Primary Examiner.*

V. W. PRETKA, *Assistant Examiner.*